United States Patent
Bauerle et al.

(10) Patent No.: US 7,392,787 B2
(45) Date of Patent: Jul. 1, 2008

(54) VIRTUAL BUMPER THROTTLE CONTROL ALGORITHM

(75) Inventors: Paul A. Bauerle, Fenton, MI (US); Patrick J. O'leary, Clinton Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 122 days.

(21) Appl. No.: 11/530,584

(22) Filed: Sep. 11, 2006

(65) Prior Publication Data

US 2008/0060613 A1 Mar. 13, 2008

(51) Int. Cl.
*F02D 9/00* (2006.01)

(52) U.S. Cl. ...................................................... 123/396

(58) Field of Classification Search .................. 123/396, 123/399, 198 F; 701/51, 97, 67; 477/107, 477/115

See application file for complete search history.

(56) References Cited

U.S. PATENT DOCUMENTS

| 6,549,838 B2 * | 4/2003 | O'Neil et al. ................. 701/51 |
| 6,739,314 B1 * | 5/2004 | Bauerle et al. .............. 123/396 |
| 7,027,920 B2 | 4/2006 | Madau ....................... 701/301 |

FOREIGN PATENT DOCUMENTS

DE 38 01 323 A1 * 7/1989
JP 11-325224 A * 11/1999

* cited by examiner

*Primary Examiner*—Hieu T Vo

(57) ABSTRACT

A control system for controlling a throttle of a vehicle during a virtual bumper event is provided. The system includes: an enable module that selectively enables torque reduction based on at least one of a torque reduction request and an object detection signal; a throttle override module that overrides a pedal request by commanding a throttle position to reduce torque when the torque reduction is enabled; and a throttle learn module that commands the throttle position to gradually increase torque based on a position indicated by the pedal request when torque reduction is no longer enabled.

20 Claims, 6 Drawing Sheets

US 7,392,787 B2

VIRTUAL BUMPER THROTTLE CONTROL ALGORITHM

FIELD

The present invention relates to methods and systems for controlling a throttle of a vehicle.

BACKGROUND

The statements in this section merely provide background information related to the present disclosure and may not constitute prior art.

Virtual bumper systems employ the use of several sensors mounted across a front and/or rear bumper of a vehicle. The sensors detect an object within a projected path of the vehicle. Both visual and audible warnings can be signaled to the driver to indicate a detected object. In addition, the brakes and the powertrain can be controlled to reduce the likelihood of a collision. More particularly, the brakes can be automatically applied and engine torque can be automatically reduced. Automatic braking and automatic torque reduction can be controlled independently. Typically the torque reduction is performed before the automatic braking to prevent the powertrain from interfering with the braking.

The application of the brakes may be intentionally controlled to be fairly abrupt. The abrupt automatic braking generally results in a driver's initial reaction to manually apply the brake pedal, thereby reinforcing the operation of the virtual bumper system. The throttle should be controlled to manage engine torque before, during, and after the application of the brakes. Ineffective control of the throttle can cause undesirable surges in engine torque.

SUMMARY

Accordingly, a control system for controlling a throttle of a vehicle during a virtual bumper event is provided. The system includes: an enable module that selectively enables torque reduction based on at least one of a torque reduction request and an object detection signal; a throttle override module that overrides a pedal request by commanding a throttle position to reduce torque when the torque reduction is enabled; and a throttle learn module that commands the throttle position to gradually increase torque based on a position indicated by the pedal request when torque reduction is no longer enabled.

In other features, a method of controlling a throttle during a virtual bumper event is provided. The method includes: receiving a torque reduction request; processing a pedal request corresponding to a position of an accelerator pedal; setting a pedal minimum equal to a predetermined maximum; and commanding a throttle position based a difference between the pedal request and the pedal minimum.

Still in other features, a method of controlling a throttle during virtual bumper events is provided. The method includes: receiving a virtual bumper request to operate the throttle in an override mode; operating the throttle in an override mode by commanding the throttle to a closed position based on the request; and transitioning out of the override mode by commanding the throttle back to an open position, gradually based on a pedal request and a throttle learn method when the torque request is no longer received.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
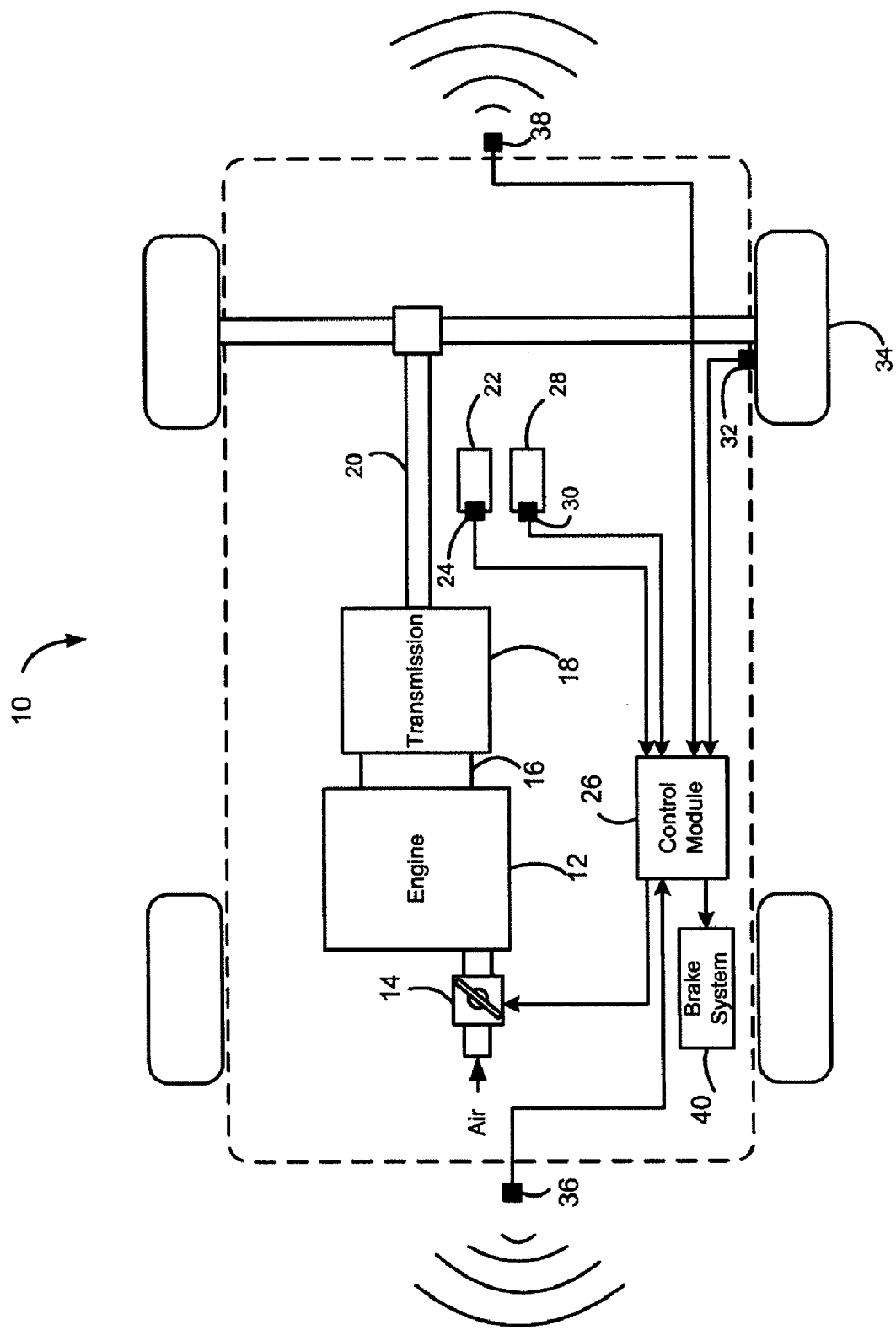
FIG. 1 is a functional block diagram of a vehicle having a virtual bumper system.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that execute one or more software or firmware programs, a combinational logic circuit and/or other suitable components that provide the described functionality. As used herein, the phrase at least one of A, B, and C should be construed to mean a logical (A or B or C), using a non-exclusive logical or. It should be understood that the disclosed methods may be executed in different forms without altering the principles of the present invention.

Referring now to FIG. 1, a vehicle 10 includes an engine 12, that combusts an air and fuel mixture within cylinders (not shown) to produce drive torque. Air is drawn into the engine 12 through a throttle 14. A torque converter 16 transfers and multiplies torque from the engine 12 to a transmission 18. The transmission 18 includes one or more gear sets that transfer torque to a driveline 20 based on a desired speed.

An accelerator pedal 22 enables a driver of the vehicle 10 to adjust the position of the throttle 14 to achieve a desired torque. An accelerator pedal position sensor 24 generates a pedal signal ($PEDAL_{REQUEST}$) indicating a position of the accelerator pedal 22. A control module 26 receives the pedal signal and adjusts the position of the throttle 14 accordingly. An initial position of the accelerator pedal 22 (zero percent) can be used to electronically control the throttle 14 to a closed position, thereby reducing the quantity of air drawn into the engine 12. As the accelerator pedal 22 is adjusted from the initial position, the throttle 14 gradually opens to increase the quantity of air delivered to the engine 12. The control module 26 adjusts fuel based on the airflow. As a greater amount of air and fuel is delivered to the engine 12, the drive torque increases.

Similarly, a brake pedal 28 allows the driver to enable a braking system 40. The braking system 40 applies a braking torque to wheels 34 and/or the driveline 20 to counter the engine torque. A brake pedal sensor 30 senses the position of the brake pedal 28 and generates a brake pedal signal accordingly. The control module 26 receives the signal and controls the braking system 40 of the vehicle 10. A vehicle speed sensor 32 senses a rotational speed of a wheel 34 and generates a vehicle speed signal accordingly. The control module 26 computes a vehicle speed from the vehicle speed signal.

The vehicle 10 includes a virtual bumper system. The virtual bumper system includes one or more object sensors 36, 38 that are fixed to a front and/or rear bumper of the vehicle 10. The object sensors 36, 38 sense objects in front of or in back of the vehicle 10 using motion, light, or other sensing methods. As the vehicle 10 moves, the object sensors 36, 38 generate a detection signal based on objects detected within the current estimated path.

The control module 26 receives the detection signal and controls the engine 12, the throttle 14, and/or the brake system 40 accordingly. More particularly, when the vehicle 10 is traveling below a predetermined speed and an object is detected, the control module 26 controls airflow and fuel such that less torque is generated and controls the brake system 40 in an attempt to decelerate the vehicle 10. The reduction in torque and the application of the brakes is performed in an effort to reduce the vehicle speed. Once the object is no longer detected and control exits the throttle control method (as will be discussed further below), the control module 26 resumes control of the engine 12, the throttle 14, and the brake system 40 according to conventional methods.

Figure 2:
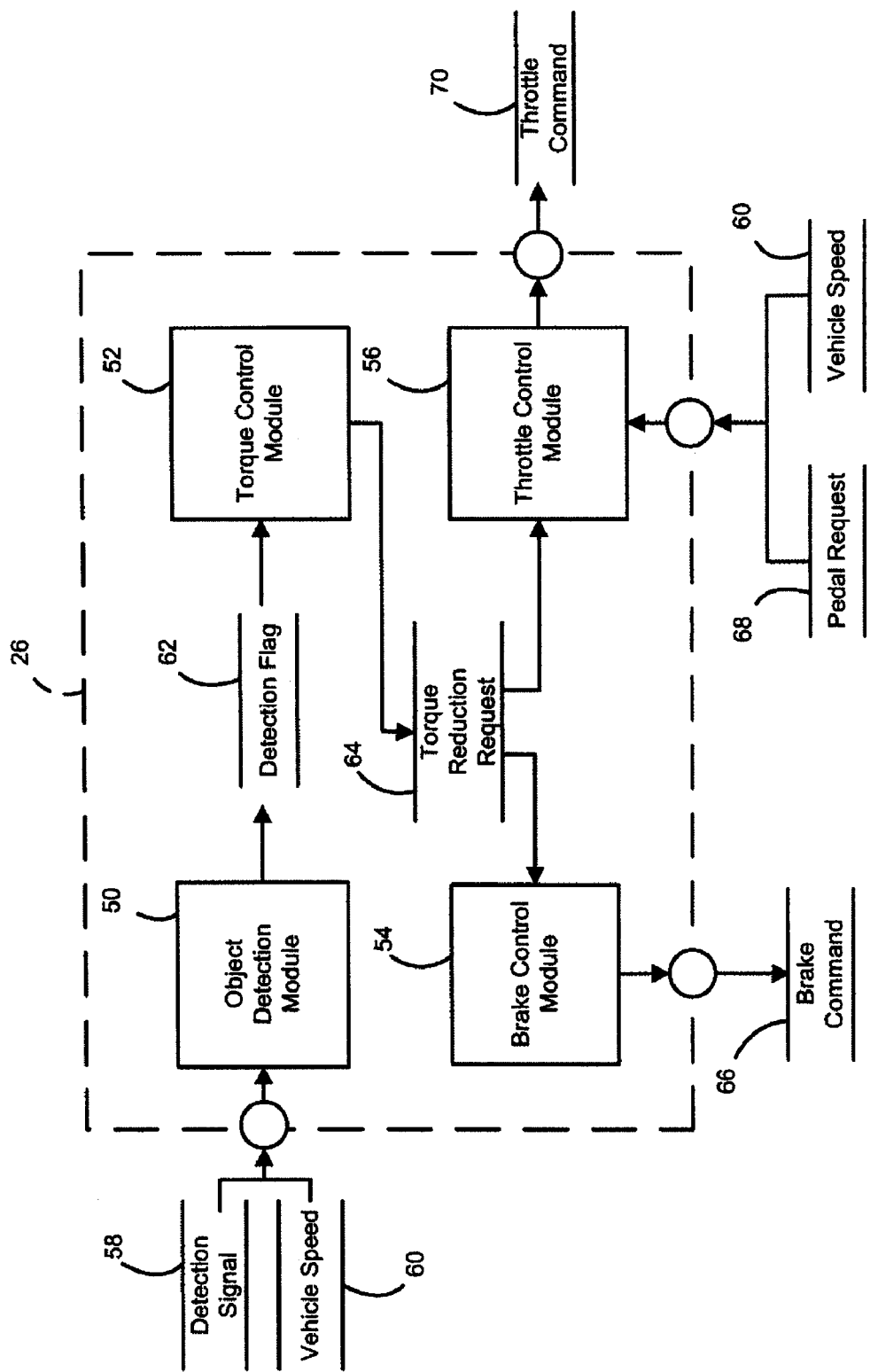
FIG. 2 is a dataflow diagram illustrating a virtual bumper control system.

Referring now to FIG. 2, a control module 26 including a virtual bumper throttle control system is shown. As can be appreciated, the functionality of the control module 26 can be partitioned into one or more control modules. For example, a separate engine control module, a separate virtual bumper control module, and a separate brake control module can be implemented. In this instance, data is communicated between the control modules via one or more known vehicle communication protocols. It is also appreciated that the functionality can be partitioned into one or more sub-modules embedded within particular control modules. For ease of the discussion, the remainder of the disclosure will be discussed in the context of a single control module 26 for controlling all features of the vehicle 10 and including the virtual bumper throttle control.

As shown in FIG. 2, the control module 26 includes an object detection module 50, a torque control module 52, a brake control module 54, and a throttle control module 56. As can be appreciated, the modules shown may be combined and/or further partitioned to similarly provide virtual bumper control. As can be appreciated, inputs to the control module 26 can be sensed from the vehicle 10, received from other control modules (not shown) within the vehicle 10, or determined by other sub-modules within the control module 26. The object detection module 50 receives as input a detection signal 58 and vehicle speed 60. When the vehicle 10 is traveling below a predetermined vehicle speed threshold and an object is detected to be within the vehicle's estimated path, a detection flag 62 is set to TRUE. Otherwise, the detection flag 62 remains FALSE. The torque control module 52 receives as input the detection flag 62. The torque control module 52 determines a torque reduction request 64 based on the detection flag 62, a determined time-to-collision, and an evaluation of a time threshold for engine torque reduction.

The throttle control module 56 receives as input the torque reduction request 64, an accelerator pedal request 68, and vehicle speed 60. The throttle control module 56 controls the throttle 14 (FIG. 1) via a throttle command 70 according to a virtual bumper throttle control method as will be discussed further below. The brake control module 54 receives as input the torque reduction request 64. Based on the torque reduction request 64, the brake control module 54 controls the brake system 40 (FIG. 1) via a brake command 66. The timing of the brake command 66 and the throttle command 70 are controlled such that the throttle control does not interfere with the brake control.

Figure 3:
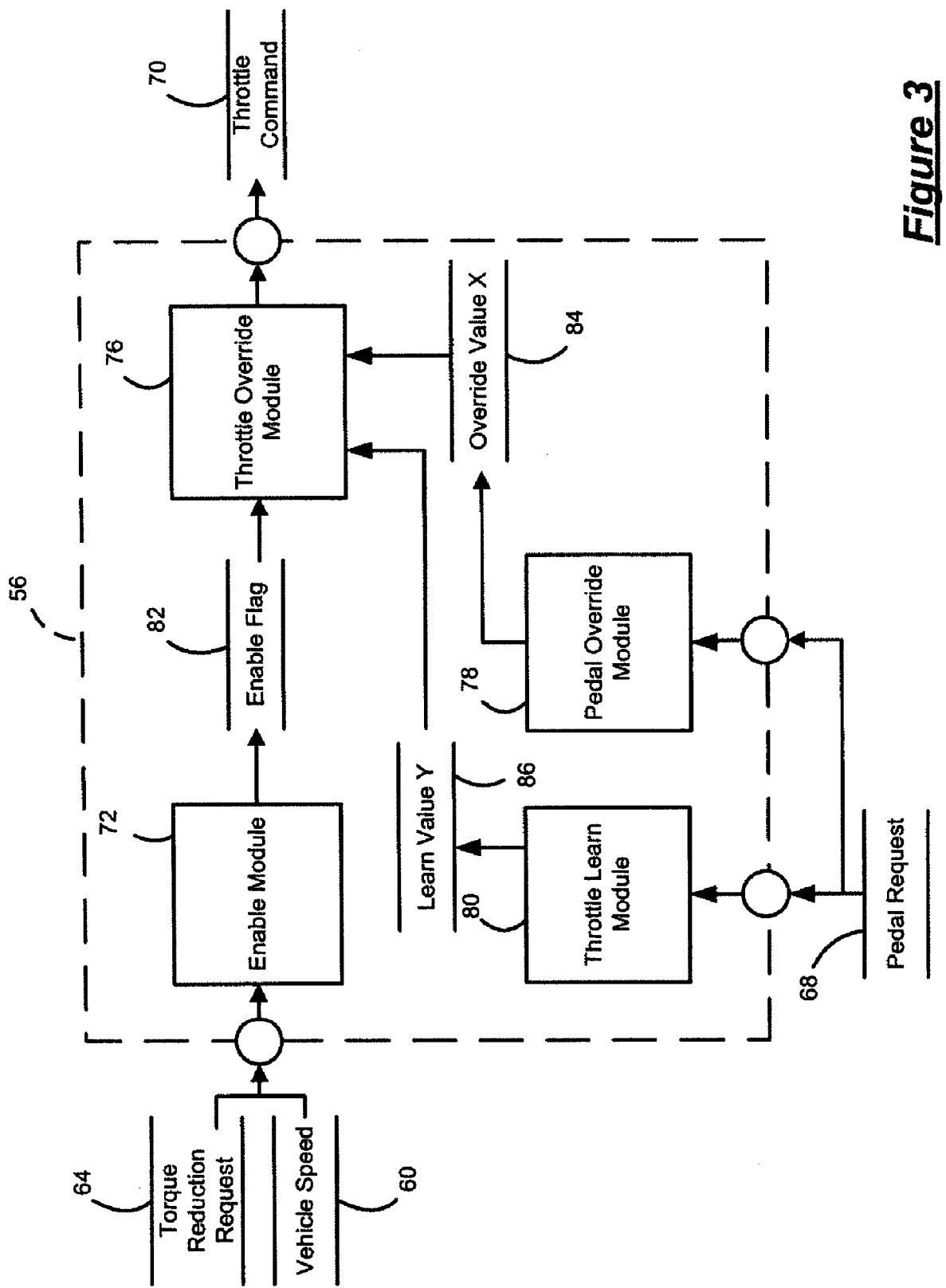
FIG. 3 is a dataflow diagram illustrating a virtual bumper throttle control system.

Referring to FIG. 3, a dataflow diagram illustrates the virtual bumper throttle system in more detail. The throttle control module 56 includes an enable module 72, a throttle override module 76, a pedal override module 78, and a throttle learn module 80. As can be appreciated, the modules shown may be combined and/or further partitioned to similarly control the throttle 14 (FIG. 1) during a virtual bumper event. The enable module 72 receives as input vehicle speed 60 and the torque reduction request 64. Based on vehicle speed 60 and the torque reduction request 64, the enable module 72 sets an enable flag 76 to enable torque reduction. The throttle override module 76 overrides the pedal request 68 and commands throttle position 70 to allow for the torque reduction when the enable flag 82 indicates a torque reduction is desired.

The pedal override module 78 detects a pedal override initiated by the operator of the vehicle 10. If the pedal request 68 is greater than a predetermined threshold, the pedal override module 78 sets an override value X 84 in order to learn the throttle position back to the position requested by the pedal request 68. The override value X 84 can be gradually updated according to a rate limiting function or a lag filter. The throttle override module 76 commands the throttle position based on the override value X even while the enable flag 82 indicates a torque reduction is desired. The throttle learn module 80 determines a learn value Y 86 in order to learn the throttle position back to the pedal request 68. The learn value Y 86 can be gradually updated according to a rate limiting function or a lag filter. The throttle override module 76 commands the throttle position based on the learn value Y 86 when the enable flag indicates that the torque reduction is no longer desired.

Figure 4:
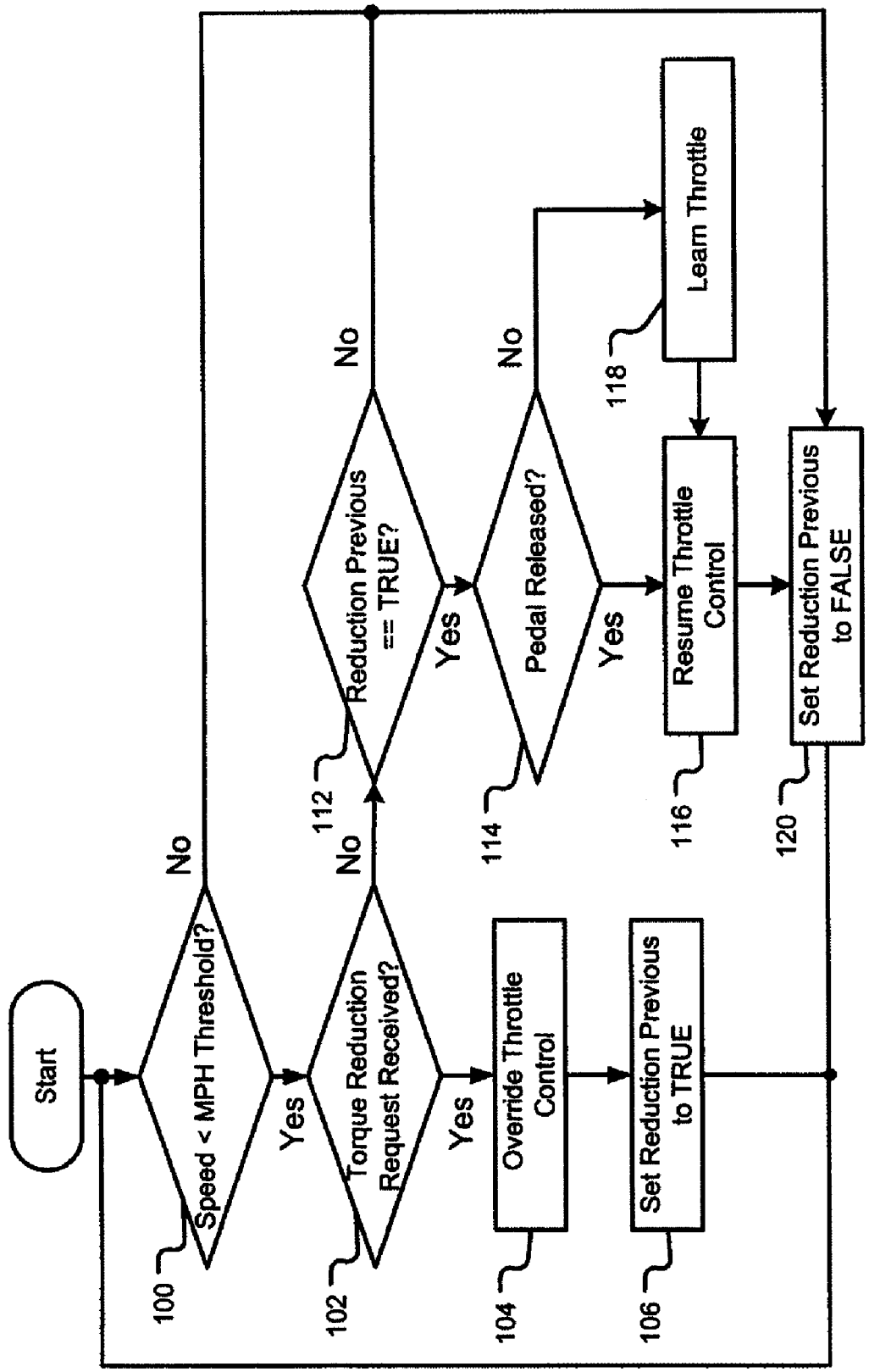
FIG. 4 is a flowchart illustrating a virtual bumper throttle control method of the virtual bumper control system.

Referring to FIG. 4, a flowchart illustrates various embodiments of the virtual bumper throttle control method of the throttle control module 56 of FIG. 3. The throttle control method can be run continually during engine operation. In various embodiments, the virtual bumper throttle control method releases the throttle control from being controlled by the accelerator pedal request during virtual bumper events, allows for the driver to override the throttle control, and allows for a smooth transition back to controlling the throttle based on the accelerator pedal request after the virtual bumper event. The method can be initiated based on the detection flag 62 of FIG. 2. In various other embodiments, the method can be initiated based on the torque reduction request 64 as shown in FIGS. 2 and 3.

More particularly, if the vehicle speed is below a predetermined threshold at 100 and a torque reduction request is received at 102, control overrides the throttle control at 104 as will be discussed in more detail below. A reduction previous flag is set to TRUE at 106. Control loops back and continues to override the throttle control while the vehicle speed is below the threshold and the torque reduction request is received. If the vehicle speed is below the predetermined threshold at 100 and the torque reduction request is no longer received at 102 but the reduction previous flag is TRUE at 112, control transitions out of the throttle override control. If during the transition the accelerator pedal request indicates that the pedal is released at 114, conventional throttle control is resumed at 116. If during the transition the accelerator pedal request indicates that the pedal is partially depressed, control applies a learning strategy to transition throttle control back to conventional throttle control as will be discussed in more detail below. The reduction previous flag is reset to FALSE at 120. Thereafter, control loops back and continues to monitor vehicle speed and torque reduction requests at 100 and 102 respectively.

Figure 5:
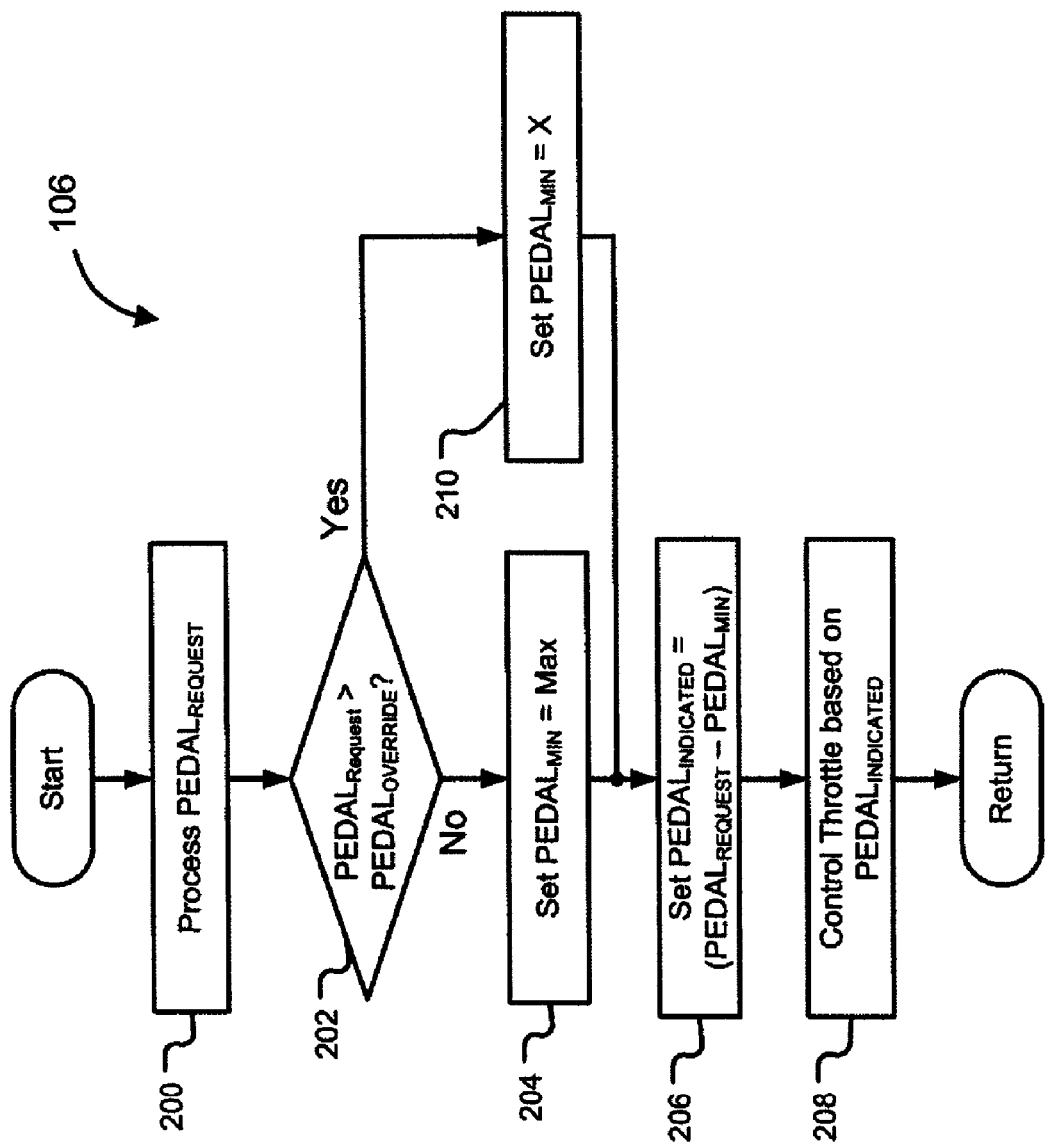
FIG. 5 is a flowchart illustrating a throttle override control method.

Referring now to FIG. 5, a method of overriding the throttle control is shown. The method can be performed by control at process box 104 of FIG. 4. The accelerator pedal request is processed at 200. If the accelerator pedal request is less than or equal to a pedal override threshold at 202 a pedal minimum value is set to a predetermined maximum at 204. In various embodiments, the maximum is equal to one hundred percent. Control sets an indicated pedal to the pedal request minus the pedal minimum at 206. Setting the pedal minimum equal to one hundred percent forces the indicated pedal to zero. Control then commands throttle based on the indicated pedal at 208. If, at 202, the accelerator pedal request is greater than the pedal override threshold, the pedal minimum is set equal to X. In various embodiments, the override threshold is a predetermined value between seventy-five and one hundred percent. This allows the driver to override the throttle control. X allows the indicated throttle to be increased to or near the pedal request. In various embodiments, X can be determined based on at least one of a rate limiting function and a lag filter. Control returns to set the reduction previous flag to TRUE at 106 of FIG. 4.

Figure 6:
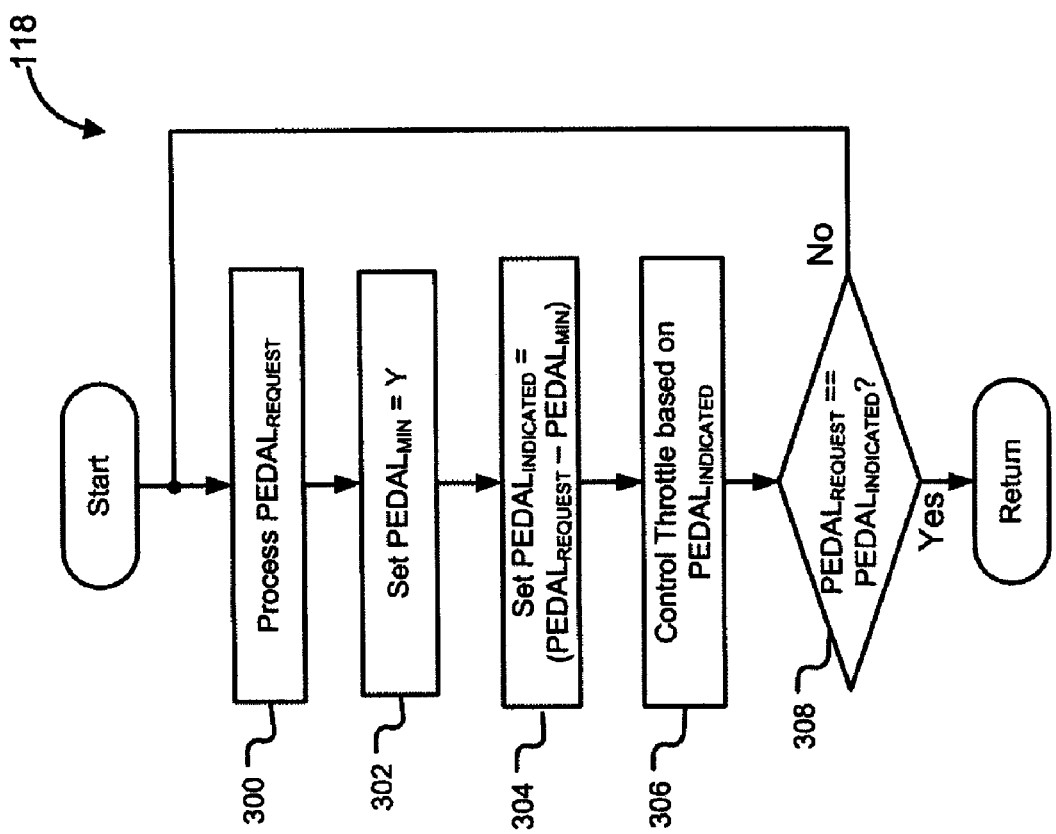
FIG. 6 is a flowchart illustrating a throttle learn method.

Referring now to FIG. 6, a throttle learn method is shown. The method is performed by control at process box 118 of FIG. 4. The accelerator pedal request is processed at 300. The pedal minimum value is set to a determined value Y at 302. Y allows the indicated throttle to be gradually increased back to the accelerator pedal request. In various embodiments, Y can be determined based on at least one of a rate limiting function and a lag filter. Control sets the indicated pedal to the accelerator pedal request minus the pedal minimum at 304. Control then commands throttle based on the indicated pedal at 306. If, at 308, the accelerator pedal request equals the indicated pedal, control returns to resume throttle control based on the accelerator pedal request at 120 of FIG. 4. Otherwise, if the indicated pedal does not equal the accelerator pedal request, then control loops back and continues to gradually increase the indicated pedal back to the accelerator pedal request.

As can be appreciated, all comparisons made in the methods above can be implemented in various forms depending on the selected values for comparison. For example, a comparison of "greater than" may be implemented as "greater than or equal to" in various embodiments. Similarly, a comparison of "less than" may be implemented as "less than or equal to" in various embodiments Those skilled in the art can now appreciate from the foregoing description that the broad teachings of the present disclosure can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for controlling a throttle of a vehicle during a virtual bumper event, comprising:
    an enable module that selectively enables torque reduction based on at least one of a torque reduction request and an object detection signal;
    a throttle override module that overrides a pedal request by commanding a throttle position to reduce torque when the torque reduction is enabled; and
    a throttle learn module that commands the throttle position to gradually increase torque based on a position indicated by the pedal request when torque reduction is no longer enabled.

2. The control system of claim 1 wherein the throttle learn module commands the throttle position to gradually increase torque based on at least one of a rate limiting function and a lag filter function.

3. The control system of claim 1 further comprising a pedal override module that detects a pedal override based on a comparison of the pedal request and a predetermined threshold and that commands the throttle position to gradually increase torque based on the pedal request when a pedal override is detected.

4. The control system of claim 3 wherein the pedal override module commands the throttle position to gradually increase torque based on at least one of a rate limiting function and a lag filter function.

5. The control system of claim 3 wherein the pedal override module commands the throttle position to gradually increase torque while torque reduction is enabled.

6. The control system of claim 1 wherein the enable module enables torque reduction based on vehicle speed.

7. The control system of claim 1 wherein the throttle override module commands the throttle to a closed position when torque reduction is enabled.

8. The control system of claim 1 wherein the throttle learn module commands the throttle to gradually open based on the pedal request.

9. A method of controlling a throttle during a virtual bumper event, comprising:
    receiving a torque reduction request;
    processing a pedal request corresponding to a position of an accelerator pedal;
    setting a pedal minimum equal to a predetermined maximum; and
    commanding a throttle position based a difference between the pedal request and the pedal minimum.

10. The method of claim 9 further comprising setting the pedal minimum based on a rate limiting function when the pedal request is greater than an override threshold.

11. The method of claim 9 further comprising setting the pedal minimum based on a lag filter function when the pedal request is greater than an override threshold.

12. The method of claim 9 further comprising commanding the throttle position based on the pedal request after the pedal request indicates that the pedal is in an initial position and the torque reduction request is no longer received.

13. The method of claim 9 further comprising commanding the throttle position based on at least one of a rate limiting function and a lag filter function when the pedal request indicates that the pedal is in a depressed position and the torque reduction request is no longer received.

14. A method of controlling a throttle during virtual bumper events, comprising:
    receiving a virtual bumper request to operate the throttle in an override mode;
    operating the throttle in an override mode by commanding the throttle to a closed position based on the request; and
    transitioning out of the override mode by commanding the throttle back to an open position, gradually based on a pedal request and a throttle learn method when the torque request is no longer received.

15. The method of claim 14 further comprising evaluating vehicle speed and wherein the operating the throttle in an override mode occurs when the vehicle speed is below a predetermined threshold.

16. The method of claim 14 wherein the throttle learn method is based on a rate limiting function.

17. The method of claim 14 wherein the throttle learn method is based on a lag filter function.

18. The method of claim 14 further comprising commanding the throttle back to an open position based on a throttle learn method when a pedal request exceeds a threshold and when the torque request is received.

19. The method of claim 18 wherein the throttle learn method is based on a rate limiting function.

20. The method of claim 18 wherein the throttle learn method is based on a lag filter function.

* * * * *